Figure 1:
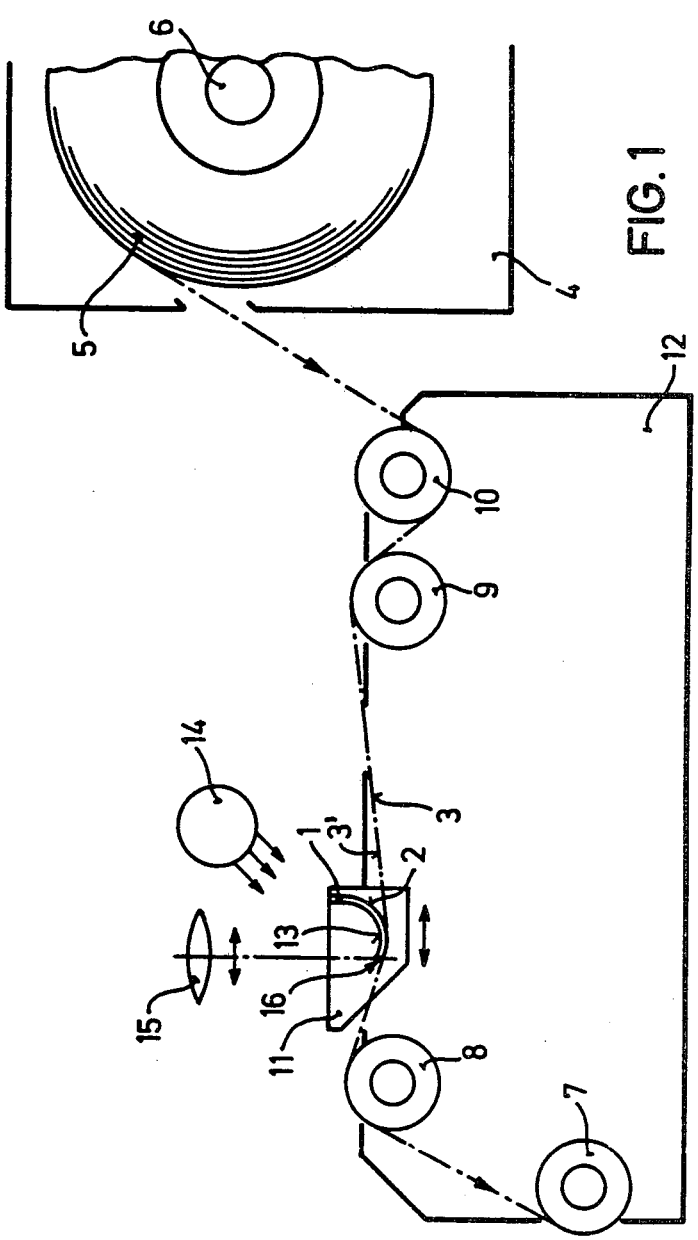

United States Patent [19]

Hammon

[11] 4,367,951

[45] Jan. 11, 1983

[54] PROCESS AND APPARATUS FOR THE SURFACE ANALYSIS OF FLEXIBLE MATERIALS

[75] Inventor: Fritz Hammon, Frankenthal, Fed. Rep. of Germany

[73] Assignee: BASF Aktiengesellschaft, Ludwigshafen, Fed. Rep. of Germany

[21] Appl. No.: 213,794

[22] Filed: Dec. 8, 1980

[30] Foreign Application Priority Data

Jan. 19, 1980 [DE] Fed. Rep. of Germany ....... 3001881

[51] Int. Cl.³ .............................................. G01B 9/02
[52] U.S. Cl. .................................. 356/357; 356/359; 356/430
[58] Field of Search .............. 356/352, 357, 359, 371, 356/430, 431

[56] References Cited

U.S. PATENT DOCUMENTS 3,359,851 12/1967 Lipschutz et al. .............. 356/359 X
3,359,852 12/1967 Wcyczyuski et al. ............. 356/359
3,843,261 10/1974 Pryor .
4,222,669 10/1980 Frosch et al. .

OTHER PUBLICATIONS

Edwards, "Microscope Interferometer", *IBM Tech. Discl. Bull.*, vol. 16, No. 2, pp. 591–592, Jul. 1973.

*Primary Examiner*—John K. Corbin
*Assistant Examiner*—Matthew W. Koren
*Attorney, Agent, or Firm*—Keil & Witherspoon

[57] ABSTRACT

The surface character of flexible materials is examined by means of interference fields which are formed by reflection of light beams from a reflecting reference surface and from the adjoining surface to be examined, and subsequent super-position of the partial beams thereby formed. The interference field which corresponds to the surface profile standing out from the reference surface is utilized to determine the length and height of the surface profile, with the aid of the interference band spacings and the wavelength of the incident light.

5 Claims, 4 Drawing Figures

PROCESS AND APPARATUS FOR THE SURFACE ANALYSIS OF FLEXIBLE MATERIALS

The present invention relates to a process for analysis of the surface character of flexible materials, especially of film webs, by producing interference bands, by means of a light beam directed at an angle onto the surface to be examined, the light beam being reflected partly from the surface and partly from another surface, and the two partial beams being superposed again. The invention further relates to an apparatus for carrying out the process.

For a number of industrial applications, flexible materials are tested continuously for their surface quality. In the manufacture of magnetic tapes, in particular, it is necessary to test the film webs, both before and after coating with the magnetizable pigment, for planarity and surface character, since it is known that fluctuations in the distance between the magnetic head and the surface of the magnetic tape have a substantial influence both on the recording and on the read voltage. Such tests are usually carried out on random samples, so as to effect a statistical control.

A sensitive method which has been used hitherto is examination and measurement by means of an interference microscope, under which interference patterns are superposed on the enlarged image of the surface to be investigated. These phenomena result from splitting of the light beams of a monochromatic light source by reflection from the surface, and refraction or reflection from a mirror, to give two partial beams which are again superposed. As a result parallel interference bands appear in the microscope at intervals of half a wavelength. With sodium light, the spacing is 0.29 $\mu$m. If the surface to be examined is uneven, the interference bands are shifted, so that interference band patterns corresponding to the surface profile result. The height of the unevennesses can be determined from the measured shifts in band spacings or from the number of interference rings surrounding the unevennesses.

Protrusions or recesses in or on the magnetizable layer of film webs or tapes in most cases have a diameter hardly larger than 25 $\mu$m; it is often even less than 2 $\mu$m. Such defects are mostly in the form of warts, or of domed or tapered protrusions, and less frequently in the form of dishing or other recesses, and are caused by faults in the magnetic dispersion. Hence, in order to be able to locate the unevennesses and to be able to count the rings surrounding them, a high magnification of the microscope must be used. As a rule, the magnification is from 250-fold to 500-fold, so that the field of observation only encompasses an area of 0.01 mm$^2$–0.05 mm$^2$. For statistically sufficiently reliable testing of film web and tape surfaces for isolated unevennesses of the above type, areas of observation of this magnitude are, however, completely inadequate.

It is an object of the present invention to provide a process and an apparatus for the analysis of the surface character of flexible materials, especially of film webs, in which a sufficiently large field of observation for the search for isolated unevennesses occurring on the surface to be examined is available, whilst at the same time the size and nature of the unevennesses located can be determined in a proper manner.

I have found that this object is achieved by a process of the type described at the outset, in which, according to the invention, the material to be examined is placed against a reflecting reference surface and the partial beams are formed by reflection from the reference surface and from the surface to be examined, so that an interference field equivalent to the surface profile, differing from the reference surface, of the material examined is formed, this interference field being evaluated in a conventional manner, by use of the interference band spacings and of the wavelength of the incident light, in order to determine the length and height of the surface profile.

In a preferred embodiment of the process, the examination for the presence of a protrusion or recess on the surface is carried out by bringing the surface field, being examined interferometrically, outside the reference surface by an advance of the web of material constituting the material being examined, and examining it outside the reference surface at an angle of from 80 to 45 degrees to the optical axis, the direction of incidence of the light beam being selected so that the incident light beam is reflected in the direction of the optical axis from any chosen surface which is anti-parallel to the plane surface, so that the brightness distribution of the surface field being examined provides conclusions as to the pattern of its flanks and hence as to the pattern of the surface profile.

The apparatus for carrying out the process comprises a device for placing the material being examined against a reflecting support, a light source, and an optical device for rendering visible the interference field produced by the examined surface of the material in question and the support surface.

An advantageous embodiment of the apparatus provides that the support is transparent and in particular that it is formed by a curved glass segment, against whose convex surface the material in question rests at least partially, by the surface to be examined, through the use of a tensioning device.

It is advantageous if the convex curvature of the glass segment is equal to the curvature of a conventional magnetic head in the region of the air gap of the head.

The support can furthermore also be formed by a second flexible material being examined.

As a further development of the apparatus according to the invention, a cine camera is directed onto the optical observation device, preferably onto the eyepiece of a microscope, for the purpose of observation by means of a television monitor and/or for storage of the information concerning the surface character, which has been rendered visible, of the material being examined.

For the purpose of locating unevennesses, a coarsening is achieved by the fact that placing the surface to be examined against a very smooth surface substantially enlarges the zone in which the unevennesses produce an optical effect. In illustrative terms, the effect is similar to that of a tent pole of a circular tent; a raised portion on the surface, for example a fixed foreign particle, lifts the material being examined, for example a piece of film, from the smooth support surface, which is to be regarded as the reference surface, over a broad zone surrounding the actual particle in the same way as an unevenness on a magnetic tape lifts the tape from the magnetic head. The base diameter of this "tent" is many times greater than the diameter of the foreign particle. If the support surface is transparent and the material being examined is illuminated, through the surface, with monochromatic light, the base of the "tent" becomes visible through interference between the light beams reflected from the material and those reflected from the support surface. This provides a simple method whereby unevennesses of the order of magnitude mentioned above can easily be discerned under low magnification of the microscope and hence over a large field of observation, by virtue of the interference rings which are produced at the boundaries which form the "tent". The height of the unevennesses, that is to say, in the example discussed, the height of the foreign particle, can be determined by counting the number of rings.

Further details and advantages of the process according to the invention and of the apparatus will be clear from the description, given below, of an embodiment illustrated in the drawing.

In the drawing

Figure 2:
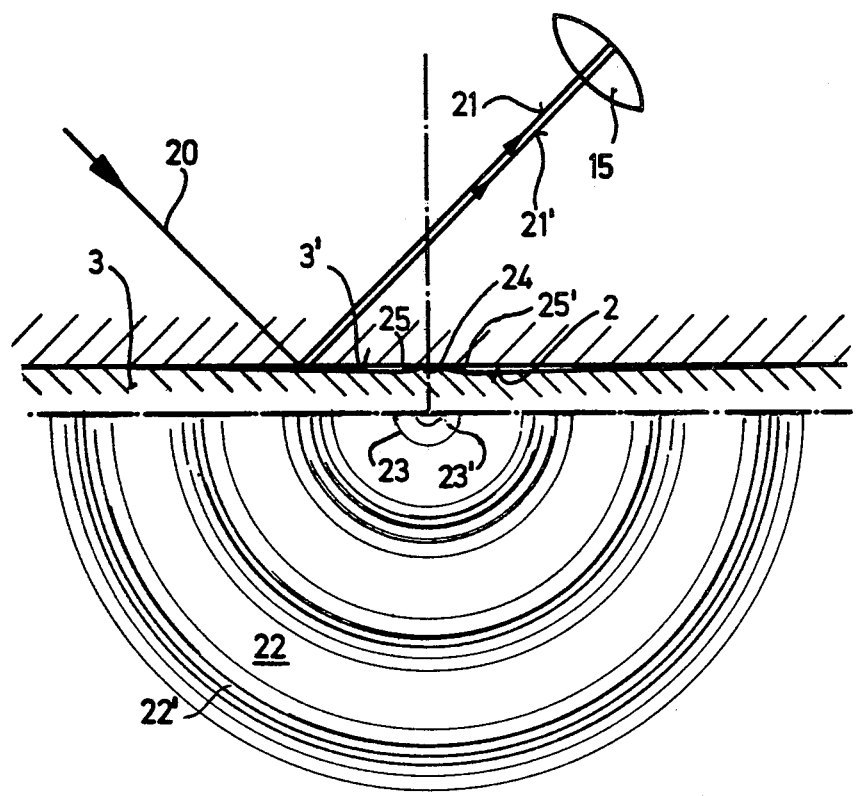
Figure 3:
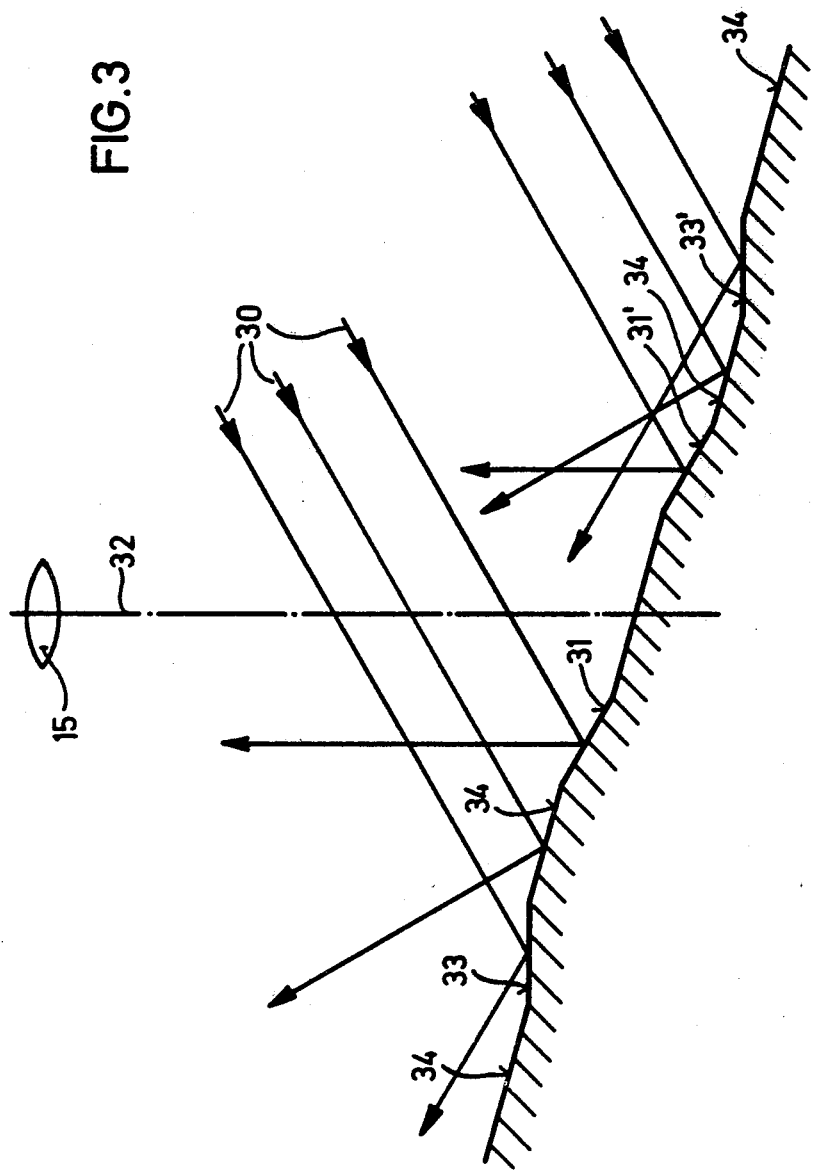
Figure 4:
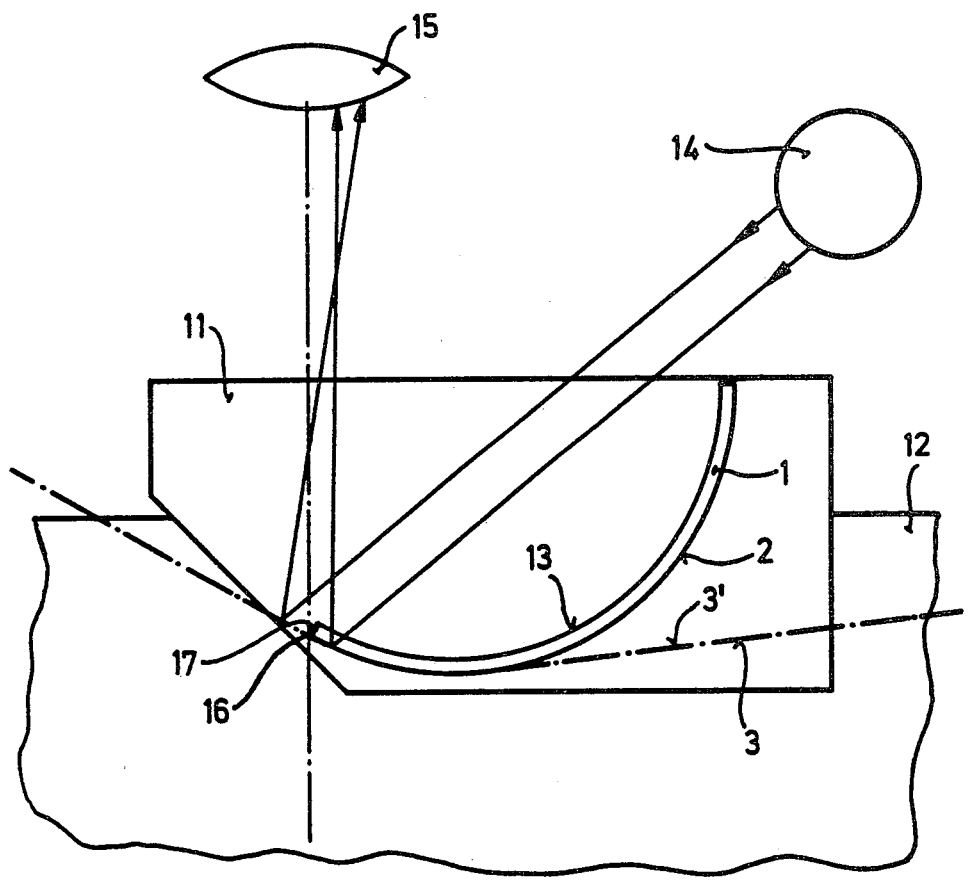

FIG. 1 diagrammatically shows the apparatus for surface analysis,

FIG. 2 diagrammatically shows a portion of the field of observation, containing an unevenness, FIG. 3 shows an enlarged surface profile of the material being examined together with the light beam arrangement used to determine the nature of the unevennesses and FIG. 4 shows a detailed view of the apparatus according to FIG. 1, depicting the arrangement for carrying out the measurement on a domed glass segment.

The central part of the apparatus is a transparent support 1 (FIGS. 1 and 4), consisting of a substantially circularly domed glass segment, over whose convex extremely smooth surface 2, which serves as the reference surface, is passed the flexible material 3 which is to be examined, for example a film web or a magnetic tape; the surface to be examined rests against the glass segment. In order to ensure similar or identical tension as in the practical use of the material under examination-hereafter referred to for simplicity as the material-a tensioning device for the material is provided. Where the material is a web or tape, the device consists of a feed roll 5, which can rotate in a housing 4 which is open in the direction of the glass segment 1 and provides protection from dust, the shaft 6 of the feed roll being braked constantly, and a take-up roll 7 for the material 3. The take-up roll can be rotated manually by means of a wheel fixed to its shaft, or by means of a very slow-running electric motor drive, in order to advance the material. Between the two rolls 5 and 7, the material runs over guide rolls 8 and 9 in order to produce contact with the convex surface 2 of the glass segment 1. Furthermore, a roll 10, covered with nonwoven, is provided immediately downstream of the feed roll 5 and serves to clean loose dust off the observed surface 3' of the material.

It has proved advantageous to supply filtered air to the housing by means of a fan, so that dust particles are kept off the material and off the feed roll.

The glass segment 1 consists of transparent glass which is preferably from 0.3 to 2 mm thick. The lower the thickness, the lower the optical distortions caused by the glass. For the examination of magnetic tapes, a radius of curvature of about 15 mm has proved advantageous, since this corresponds to the radius of most magnetic head surfaces, so that conditions corresponding to head contact in practical operation result.

The end face 17 of the glass segment 1 (FIG. 4) is ground so as to make an angle of 60° with the surface of the material 3. This ground surface avoids shadowing on the lower edge 16 of the end face 17 and also permits observation of the material 3 through the narrow side.

The glass segment 1 is fixed in guide slots of the segment carrier 11 in such a way that the tangent at the edge 16 is inclined at an angle of about 60° to the axis of observation.

The glass segment carrier 11, guided by means of grooves, can be moved on the two end plates 12, which also carry the rolls 7 to 10, in the direction of travel, and parallel to, the material 3, and can be locked onto these end plates by 2 clamping screws on either side of the segment carrier 11.

A sodium vapor lamp 14, serving as the light source, is located above the glass segment 1, that is to say above its convex surface 13, in such a way that its light beams impinge at an angle of about 45° to the horizontal, that is to say at an angle of about 105° on the reference surface 2 at the edge 16 and on the material 3 which is drawn tangentially off the glass segment.

An optical device 15, also located above the surface 13, for rendering visible the interference field produced by the contacting surfaces 2 and 3'—the device preferably being a microscope—is so aligned that its optical axis approximately touches the edge 16. Accordingly, the field of observation is halved by the edge 16, to give an image half with the material 3 under the glass, and an image half with the free material 3 inclined at an angle of about 30° to the optical axis. The first image half is used for location, and height measurement, of the unevennesses, as already summarized above.

The second image half is used, as explained later, to determine the nature of the unevennesses and to assess visually the overall structure of the surface.

The apparatus can be supplemented by a counter for determining the length of web or tape which has been examined. This counter is in that case connected to the shaft of the take-up roll 7.

In carrying out the process, the carrier 11 is first removed and the material 3 inserted into the tape guide. The carrier 11, with the glass segment 1, is then reinserted and adjusted so that the material leaves tangentially at the edge 16. As already explained, the material 3 is lifted off the convex surface 2 of the glass segment 1 in a tent-like manner by any unevenness projecting from the surface 3' of the material, so that—as shown in FIG. 2—the incident monochromatic light 20 is partially reflected from the surface 2 and partially from the surface 3' which is to be examined. As a result of the differences in transit time between the resulting partial beams 21, 21', and as a result of a phase rotation through 180° on reflection from the denser medium, destructive and constructive interference takes place on superposition of the partial beams, depending on the path difference. These superposition phenomena, referred to as interference, become visible on a screen or in the microscope 15, in the first image half, as light and dark bands 22, 22', which, if the surface 3' is lifted off the support by point-like unevennesses, are in the shape of rings. The distance between two adjacent interference rings 22' corresponds to a change in distance between the surfaces 2 and 3' of half a wavelength of the incident light, that is to say 0.29 μm in the case of sodium vapor light. If this change in distance is multiplied by the number of interference rings 22' of the entire pattern caused by the unevennesses, the height of the actual unevenness, for example a cone or dome protruding from the surface 3', is obtained. The diameter of the entire surface disturbance caused by the cone or by the dome can at the same time be determined by means of a scale grid of the microscope.

Care must be taken that the very fine and closely spaced interference rings 23, 23' in the center of the surface disturbance, that is to say immediately surrounding the protrusion 24, which differ clearly from the interference rings 22, 22', should be left out of account. They are produced on the actual steep flank 25, 25' of the protrusion. Of course, given sufficient magnification, the height can also be measured by means of these interference rings.

As can be seen, the surface of the material can, by virtue of the large interference pattern, be scanned rapidly and thoroughly for unevennesses of the initially mentioned type, whose size is of a $\mu$m order. We have found that 10-fold to 20-fold magnification of the microscope suffices for counting the interference rings. This corresponds to a field of observation of from 330 to 50 mm$^2$, which is from 1,000 to 10,000 times larger than that observed in methods of examination employing an interference microscope.

The question next arises of how to differentiate between protrusions and recesses in the examined surface 3' of the material 3. One feature of protrusions is, for example, the second interference ring system in the center of the surface disturbance, as mentioned above. Recesses have only a central interference ring system of small diameter, since they do not cause the material to be lifted off the reference surface 2. A further feature is that in the case of a recess, a change in tension of the material also changes the number of interference rings. Further, in the case of recesses, the spacing of the inner interference rings is greater than that of the outer interference rings.

Protrusions and recesses can be made directly discernible in the second image half of the optical observation device 15. For this purpose, the surface field which has been examined interferometrically under the glass segment is brought to outsde the glass segment, immediately beyond the edge 16, by advancing the material by turning the take-up roll 7. The light beam 30 (FIG. 3) incident from the sodium vapor lamp 14 is adjusted so that a flank 31, 31' of the unevenness, which flank is a rising flank viewed in the direction of incidence, produces a reflection substantially in the direction of the optical axis 32 of the observation device 15, whilst the light reflected from a falling flank 33, 33' deviates from the optical axis.

Under these circumstances, the rising flanks appear more or less bright and the falling flanks more or less dark, depending on the inclination; the plane parts 34 of the surface are of intermediate brightness, so that the shape and structure of the protrusions 31, 33, and of the recesses 31', 33', which can be differentiated from one another by the position of the flanks, that is to say the light and dark areas in relation to the direction of incidence of the light, are discernible. Of course the converse reflection conditions can also be selected.

The process according to the invention, and the apparatus, are not restricted to the use of a glass segment. Flexible support surfaces and plane support surfaces can also be employed. The critical factor is that it should be possible to bring the examined surface of the material into sufficient contact with the support surface.

For example, it has proved advantageous to examine the surface of plastic films in two superposed layers, using the process described above, with one layer being the support surface or reference surface for the other. In this way, twice the surface is tested in one pass. In the case of transparent films, the reference surface can also be a non-transparent but reflecting convex surface, for example the cylindrical surface of a chromed rod.

To make use of the above possibility, the sample to be examined is cut, in several layers, from the outer layers of the roll of film, and is placed on a plane support, which is inclined so that the light reflected by the film enters the optical system of a microscope located above the film. After all but two of the superposed pieces of film have been removed, and any air which may have come between the layers has been pressed out by running a squeeze roller over the sample, the examination can be carried out. The upper layer of the two pieces of film now takes the place of the glass segment. The adhesion between the two pieces, and a certain amount of electrostatic charge, ensure that the two film surfaces rest completely against one another. This method ensures that in preparing for the examination, and during the latter, no foreign particles, which would falsify the result, reach the surface to be examined.

I claim:

1. A process for the analysis of the surface character of a web of flexible material, said process comprising:
    placing the surface portion to be examined against a reflecting reference surface,
    directing a light beam at an angle onto said surface portion such that the light beam is reflected partially from said surface portion and partially from the reference surface,
    superposing the resulting partial beams so that a pattern of interference bands corresponding to the surface profile of said portion is formed,
    evaluating the interference pattern on the basis of the interference band spacings and the wave length of the incident light,
    advancing the web of material so that said surface portion extends, at a location outside the range of said reference surface, in a plane inclined to the optical axis at an angle of from 80 to 45 degrees,
    examining the surface portion in said location with the direction of incidence of the light beam selected so that the incident light beam is reflected in the direction of the optical axis from a predetermined surface element which is anti-parallel to said plane, and
    determining from such examination the overall pattern of the surface profile, using the brightness distribution of the observed surface field to distinguish protrusions from recesses on said surface.

2. The process as claimed in claim 1, wherein the light being directed onto the surface to be examined is monochromatic.

3. An apparatus for the analysis of the surface character of a web of flexible material, comprising:
    a segment of transparent material having a convex surface ending in an edge,
    means for urging said web of material against at least a part of said convex surface,
    means for directing a light beam through said segment at an angle to said web so that said light is reflected partially from said web and partially from said segment,
    means for guiding said web past said edge free of said segment along an inclined plane, and
    means for observing the reflected light within the image split by said edge into a first part and a second part, said first part containing the light reflected partially from the web and partially from said segment and hence the pattern of interference bands produced by the surface profile of the corresponding web portion, thereby permitting location and height measurement of unevennesses of the web surface, and said second part containing the light reflected from the inclined free portion of the web, thereby permitting distinction between protrusions and recesses of the unevennesses on the basis of the brightness distribution in the second part of the image, as well as determination of the overall surface structure viewed in said second part.

4. The apparatus as claimed in claim 3, wherein the convex curvature of the transparent segment is equal to the curvature of magnetic heads in the region of the air gap of such heads.

5. The apparatus as claimed in claim 3 or 4, wherein the observing means is the eyepiece of a microscope, and wherein, for the purpose of observation by means of a television monitor and/or for storage of the information concerning the surface character of the material under observation, which surface character has been rendered visible, there is provided a video camera, said camera being directed onto the eyepiece.

* * * * *